G. WESTINGHOUSE, Jr.

Steam-Power Air-Brake Devices.

No. 5,505. Reissued July 29, 1873.

WITNESSES
James A. Kay
R. O. Henderson

INVENTOR
George Westinghouse Jr.
by Bakewell, Christy & Kirn
his Attys.

AM. PHOTO-LITHOGRAPHIC CO. N.Y. (OSBORNE'S PROCESS.)

UNITED STATES PATENT OFFICE.

GEORGE WESTINGHOUSE, JR., OF PITTSBURG, PENNSYLVANIA.

IMPROVEMENT IN STEAM-POWER AIR-BRAKE DEVICES.

Specification forming part of Letters Patent No. 117,841, dated August 8, 1871; Reissue No. 5,505, dated July 29, 1873; application filed May 26, 1873.

*To all whom it may concern:*

Be it known that I, GEORGE WESTINGHOUSE, Jr., of Pittsburg, in the county of Allegheny and State of Pennsylvania, have invented a new and useful Improvement in Steam-Power Air-Brake Devices; and I do hereby declare the following to be a full, clear, and exact description thereof, reference being had to the accompanying drawings, making a part of this specification, in which—

Figure 1:
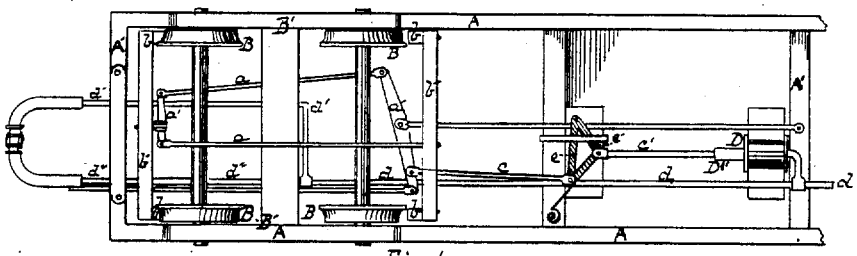
Figure 2:
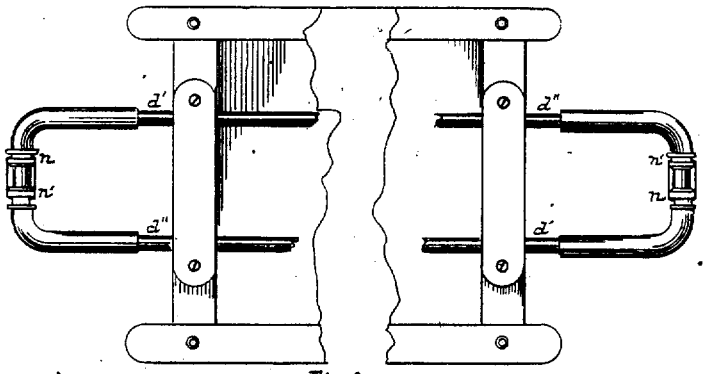
Figure 3:
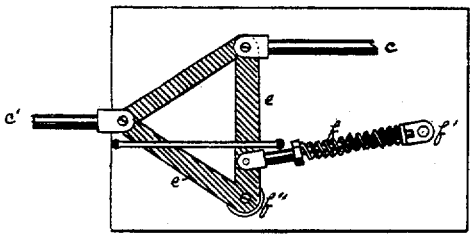

Figure 1 is a plan view of an inverted half of a railway-car illustrative of my improvement. Fig. 2 is an enlarged detached view of the car ends, more particularly illustrative of the double coupling arrangement; and Fig. 3 is a detached view of the form of lever shown in Fig. 1, arranged with a spring for more perfectly and expeditiously causing the brake-shoes to clear the wheels when the brakes are let off.

Like letters of reference indicate like parts in each.

The present invention relates more particularly to an improvement on the invention secured to me by Letters Patent of the United States, dated April 13, 1869; and it consists in an improved construction and combination of devices for operating the brakes by the power of compressed air, substantially as hereinafter described and claimed.

To enable others skilled in the art to make and use my invention, I will proceed to describe its construction and operation.

The frame-work A A′ of the car, the wheels B, brake-bars *b′*, rubbers or shoes *b*, and truck-frame B′ are of the usual or any known construction. Power is communicated to the brakes by any suitable arrangement of rods *a* and levers *a′*. The brake-cylinder D receives compressed air by the air-pipe *d*, and power is communicated from it by a piston-stem in the manner described in the patent hereinbefore mentioned. Connection is made from the piston-stem to the rod *c′* by means of a hollow sleeve, D″, which permits the rod *c′* to play back and forth, when the brakes are being operated by hand, without destroying the power connection. A connecting-rod, *c*, leads forward to the brake-lever, as shown.

In applying car-brakes it is desirable that the movement of the brake-shoes at first be rapid, so that they shall engage the wheels as quickly as possible, and, after they have engaged the wheels, that they be pressed against them with great force. Before they touch the wheels they offer no great resistance. After they engage the wheels their motion is little, but the resistance is great. Now, in order to apply the power rapidly at first, while the resistance is small, and with greater force afterward, when the shoes engage the wheels, I introduce between the rods *c c′* the ordinary form of bent lever *e e′*, or make it triangular in shape, as shown, by connecting the outer ends of the longer and shorter arms. This lever is pivoted to the car at the junction of the arms *e e′*. The connecting-rod *c* that leads to the brake-lever is pivoted to the outer end of the longer arm *e*, and the rod *c′*, leading from the piston-stem in the sleeve D″, is pivoted to the outer end of the shorter arm *e′*. It will now be obvious that the power acting on the end of the shorter arm *e′* will at first give a rapid throw to the rod *c* and cause the brake-shoes to approach the wheels rapidly; and that, as the rods *c c′* come into line, and the brake-shoes engage the wheels, the power will be applied more slowly, (the leverage being lessened,) but with greater effect.

It is also important, in the operation of car-brakes, that, when released, they clear the wheels quickly and entirely. To secure this I connect a spring, *f*, of any suitable form, (but preferably a spiral, as shown,) with the longer arm *e*, substantially in the manner shown in Fig. 3. During the first part of the outward thrust of the rod *c′* the spring, while being compressed, comes gradually into line with its own pivoting-point *f′* and the pivoting-point *f″* of the bent lever; and the power expended in compressing it lessens at the very time when the maximum of power is required on the brake-shoes. When the brakes are let off the shoes partially clear themselves at once from the wheels. The object of the spring *f* is to cause them to clear the wheels entirely. As the lever comes back the power or leverage of the spring on it increases, since the spring acts on the longer arm *e* more nearly at right angles to its length; consequently the power of the spring is applied with greatest effect at the time it is most needed, v i z., as that p of the clearing or releasing movement of the brake-shoes at which they have the least tendency to release themselves and clear the wheels entirely. By this means I have found that I can almost instantly bring the brake-shoes back entirely clear of the wheels as soon as the air is let off from the cylinder D.

In Fig. 1, which represents the apparatus as applied to only half a car, I have shown the air-pipe *d* as branching toward the end of the car into two pipes, *d′ d″*, with flexible ends. The same pipe *d* branches at the other end of the car in the same way. In Fig. 2 I have shown these branching pipes in an enlarged view as they are applied on the opposite ends of the same car, and with an arrangement of male and female couplings presently to be explained.

If a single pipe, *d*, extended from end to end of each car, and had a male coupling at the forward end and a female coupling at the rear end, or vice versa, it is obvious that, in case any one car was turned end for end, its pipes would not couple into the pipes of the next car at either end, since two male and two female couplings wou'd come together. Now, by branching the pipe *d*, as set forth, and putting a male coupling, *n*, on the right-hand pipe *d′*, at each end, and a female coupling, *n′*, on the left-hand pipe *d″*, at each end, or vice versa, (either arrangement being followed in all cases,) it will be seen that each car will have a right-hand male for the left-hand female and a left-hand female for the right-hand male of the next car at each end, or vice versa, if the reverse arrangement be adopted; and, also, that no matter if any or all the cars of a train be turned end for end, the couplings will always have the same relative arrangement; and this arrangement of the couplings diagonally opposite on branching pipes I include as a part of this invention.

As shown in Fig. 2, the couplings at each end are united together. This is usually done when the cars are not in use, and is also done on the rear end of the last car of a train, the better to exclude dust and preserve the couplings from injury.

What I claim as my invention, and desire to secure by Letters Patent, is—

1. A bent lever receiving power by its shorter arm from the piston-stem and communicating the same from its longer arm to the brake-lever, arranged and combined substantially as described.

2. A spring arranged in connection with the lever in a power car-brake apparatus, so that the spring will act with a continually-increasing power in causing the brake-shoes to clear the wheels, substantially as described.

3. In a power car-brake apparatus, the arrangement of male and female pipe-couplings, with flexible connections at each end of the car, substantially as described.

4. The arrangement of two pipes at each end of each car furnished with flexible connections and suitable couplings, so that the pipes at the end of any car of the train may be coupled together, thus effectually closing both pipes.

In witness whereof I, the said GEORGE WESTINGHOUSE, Jr., have hereunto set my hand.

GEORGE WESTINGHOUSE, JR.

Witnesses:

T. B. KERR,

G. H. CHRISTY.